O. MICHAUD.
TIRE.
APPLICATION FILED FEB. 4, 1914.

1,149,935.

Patented Aug. 10, 1915.

Witnesses
C. James Cron
Geo. A. Byrne

Inventor
Oscar Michaud
By Victor J. Evans
Attorney

UNITED STATES PATENT OFFICE.

OSCAR MICHAUD, OF SALEM, MASSACHUSETTS.

TIRE.

1,149,935.

Specification of Letters Patent.

Patented Aug. 10, 1915.

Application filed February 4, 1914. Serial No. 816,424.

*To all whom it may concern:*

Be it known that I, OSCAR MICHAUD, a citizen of the United States of America, residing at Salem, in the county of Essex and State of Massachusetts, have invented new and useful Improvements in Tires, of which the following is a specification.

This invention relates to improvements in vehicle wheels and has for its general object to eliminate the expensive pneumatic tire now in use and to adapt a vehicle wheel, whereby the desired resiliency may be obtained in a more efficient and economical manner. And to this end the invention resides in connecting a solid rubber tire mounted on an outer rim to an inner rim through the means of a pneumatic tube.

Other objects will appear and be better understood from that embodiment of my invention of which the following is a specification, reference being had to the accompanying drawings forming part hereof in which:—

Figure 1:
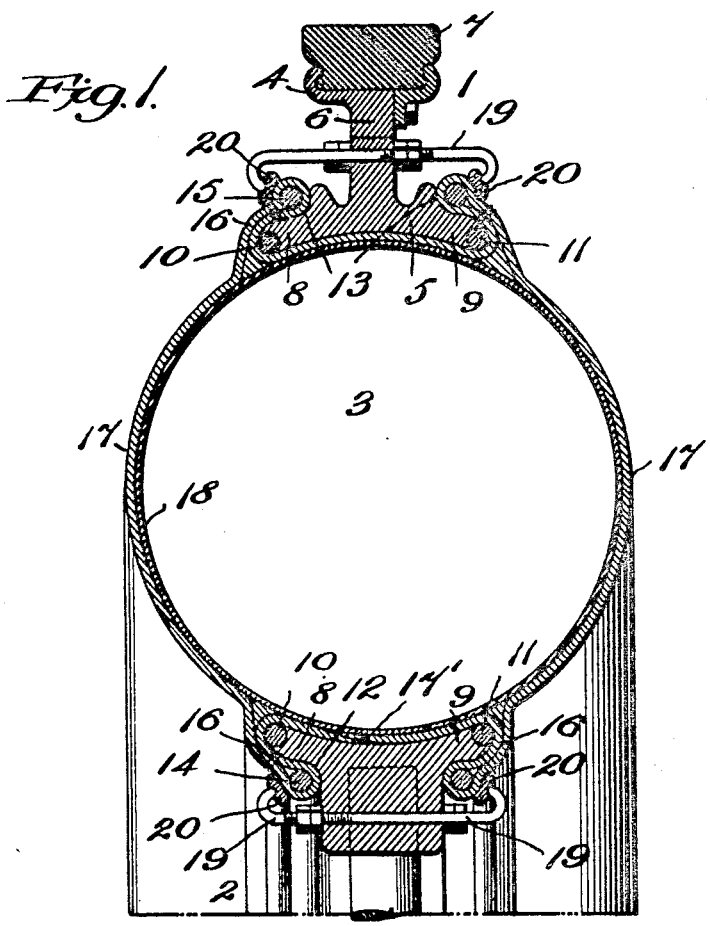
Figure 2:
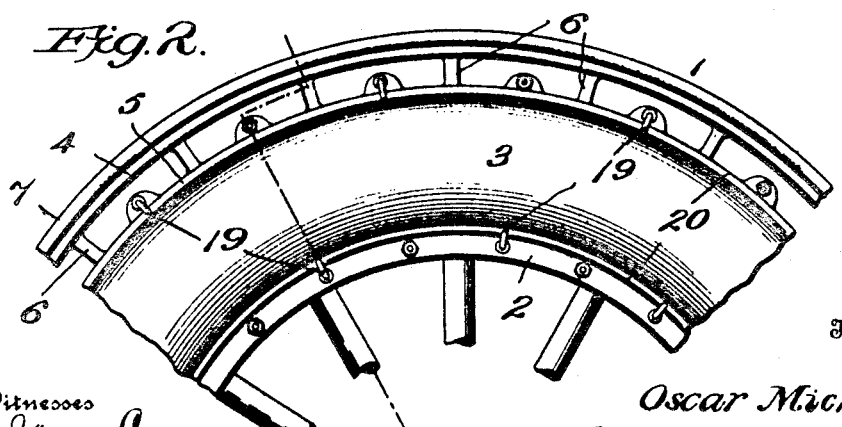

Figure 1 is an enlarged cross sectional view of my improved vehicle wheel taken on the line 1—1 of Fig. 2. Fig. 2 is a side elevational view of a portion of my improved wheel.

My improved vehicle wheel comprises an inner rim 1 and an outer rim 2 suitably connected by means of a pneumatic tube 3. The outer rim is preferably formed of strong and durable metal such as aluminum, and is provided with an outer or tread portion 4 and an inner or clencher portion 5 suitably connected by means of the spokes or webs 6. To the thread portion 4 is detachably mounted a solid rubber tire 7 which may be readily removed and replaced when desired.

The opposed sides of both the inner rim 1 and the outer rim 2 are substantially the same shape in cross section and are provided with the laterally extended side portions 8 and 9, in the ends of which are secured the protecting rings 10 and 11 for preventing the cutting of the pneumatic tube when the wheel is in use. Peripheral grooves 12 and 13 are also provided on both the inner and outer rims for receiving the rings 14 and 15 embedded within the overlapping ends 16 of the outer shoe or casing 17 of the pneumatic tube. The outer shoe or casing is preferably formed of strong and durable canvas and is of the shape shown on the drawings and has its meeting ends 17' overlapping each other and held to the outer surface of the inner flange of the wheel when the pneumatic tube is secured to position.

An inner casing 18 formed of rubber is secured within the outer casing and is designed to be inflated by means of a suitable valve (not shown).

Clamping hooks 19 are provided within the inner and outer rims for clamping the bands 20 against the shoe retaining rings 14 and 15 and for securing the retaining rings within the peripheral grooves when the tube is secured in position.

It is obvious that those skilled in the art may vary the details of construction and arrangements of parts without departing from the spirit of my invention and therefore I do not wish to be limited to such features except as may be required by the claim.

What is claimed as new is:

A wheel comprising inner and outer rims provided at their sides with grooves, rings circular in cross section embedded in the rims at the edges thereof, a casing located between the rims and bearing against said rings and having folded portions which extend into the grooves of the rims, other rings located between the folds of the casing at the grooves of the rims, and means carried by the rims for forcing the rings and casing toward and into the grooves.

In testimony whereof I affix my signature in presence of two witnesses.

OSCAR MICHAUD.

Witnesses:
 ARTHUR S. FOLD,
 WILLIAM M. PAGE.

Copies of this patent may be obtained for five cents each, by addressing the "Commissioner of Patents, Washington, D. C."